Oct. 26, 1965 F. F. OFFNER 3,214,703

NEGATIVE FEED-BACK AMPLIFIER

Original Filed Feb. 2, 1959

INVENTOR

Franklin F. Offner

BY Pierce, Scheffler & Parker

ATTORNEYS 3,214,703
NEGATIVE FEED-BACK AMPLIFIER
Franklin F. Offner, 1890 Telegraph Road, Deerfield, Ill.
Continuation of application Ser. No. 790,498, Feb. 2, 1959. This application July 14, 1964, Ser. No. 382,568
4 Claims. (Cl. 330—9)

The present invention relates to electronic amplifiers and more particularly to an improved arrangement for providing negative feed-back from the output to the input sides of the amplifier in order to stabilize operation of the amplifier. The present application is a continuation of my copending application Serial No. 790,498, filed February 2, 1959 now abandoned.

A more particular object of the invention is to provide an improved amplifier which includes an input modulator in the form of a chopper and an input transformer the primary of which is connected to the chopper. Alternating current negative feed-back from the output transformer is fed in series with the primary of the input transformer to provide a stabilized operation. This form of feed-back has the advantage in that by including the primary winding of the input transformer in the feed-back loop it tends to nullify effects of variations in characteristics of the input transformer and it also raises the input impedance to the amplifier.

Figure 1:
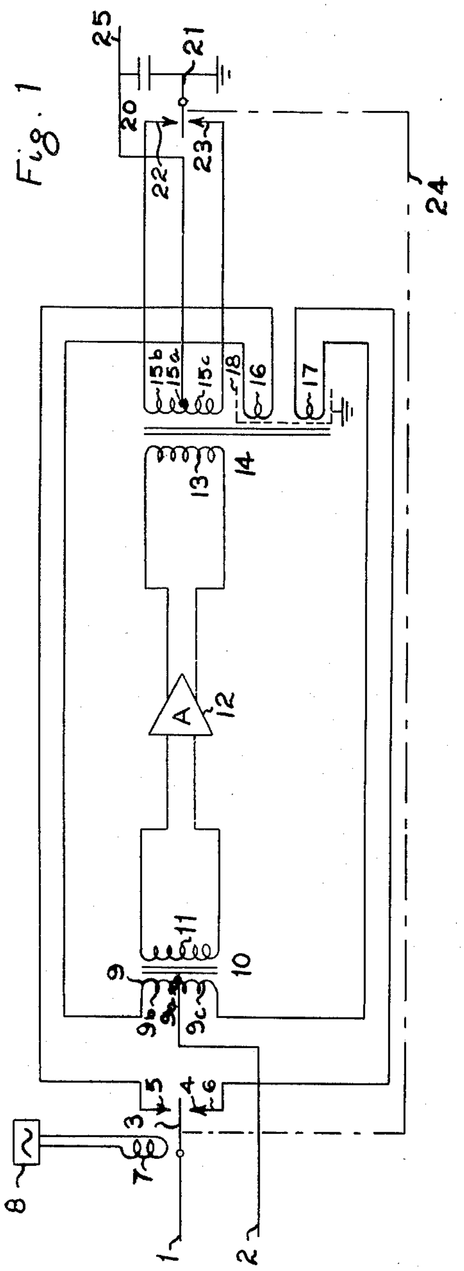
Figure 2:
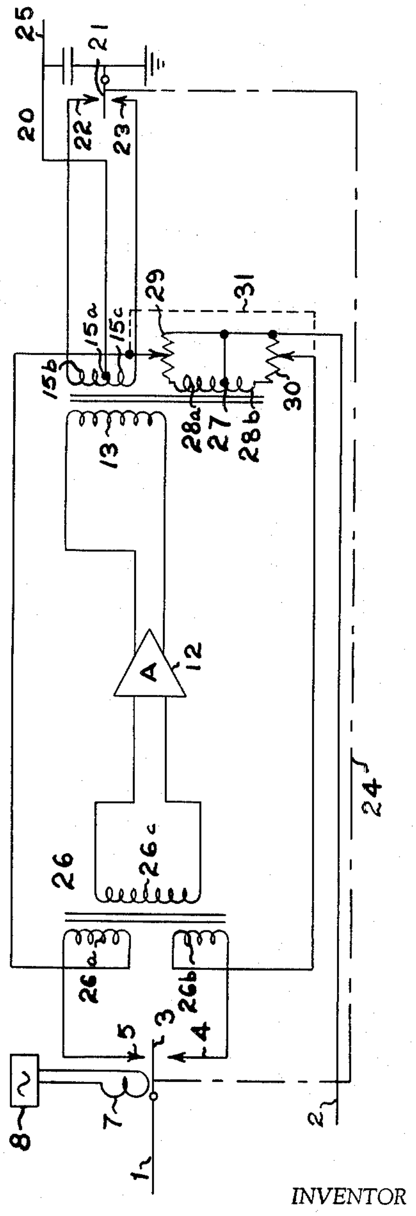

The foregoing as well as other objects and advantages inherent in the invention will become more apparent from the following detailed description of two embodiments thereof and from the accompanying drawings wherein:

FIG. 1 is a circuit diagram illustrating one embodiment of the invention wherein the input transformer has a center tapped primary and the alternating current negative feed-back is obtained by two separate tertiary windings in the output transformer which are connected respectively in series with the two halves of the primary winding of the input transformer; and FIG. 2 is also a circuit diagram showing a second embodiment of the invention wherein the input transformer has two separate primary windings and the alternating current negative feed-back is obtained by a single, center tapped tertiary winding on the output transformer, the two halves of the tertiary winding being connected respectively in series with the two separate primary windings of the input transformer.

With reference now to FIG. 1, the signal input which may, for example, be derived from electrodes placed on the head of a subject for recording an electroencephalogram, is applied to input leads 1 and 2. Input lead 1 is connected to the movable blade 3 of a chopper type switch 4, the blade 3 being oscillatable between two stationary contact members 5, 6. Oscillation of blade 3 is effected by means of a vibrator coil 7 which can be supplied with alternating current at a suitable frequency, for example, 400 cycles/sec. from a power source 8. Input lead 2 is connected to the center tap point **9*a* on the primary winding 9 of an input transformer 10. As blade 3 oscillates between contact members 5 and 6 the input signal is applied in alternation to the two halves 9*b*, 9*c* of the primary winding 9. A differential action is achieved through use of the chopper switch 4 in conjunction with the input transformer 10. This results in isolation of the input circuit from ground, so that the amplifier is responsive essentially only to the voltage difference between input leads 1 and 2**.

The output from the secondary winding 11 of input transformer 10 is applied as the input to the input stage of a multi-stage pre-amplifier unit 12 which is shown in block form only since its details are not essential to the invention itself as hereinafter defined. The output stage of amplifier unit 12 is connected to the primary winding

13 of an output transformer 14 and the latter is provided with a secondary winding having a center tap point **15*a* and two-so-called tertiary windings 16 and 17 preferably having the same number of turns and which are preferably shielded from the primary and secondary windings 13, 15 by an electrostatic shield member 18 which is grounded. Tertiary winding 16 is connected back to the primary winding of the input transformer so as to be in series opposition to the voltage impressed across primary winding half 9*b* when chopper blade 3 engages contact member 5, and similarly, tertiary winding 17 is connected back to the input transformer so as to be in series opposition to the voltage impressed across primary winding half 9*c* when chopper blade 3 engages contact member 6**.

The two tertiary windings 16, 17 thus supply negative alternating current feed-back to the input of the amplifier and which the advantage of including the input transformer within the feed-back loop. This tends to nullify any adverse effects which may arise as a result of variations in input transformer characteristics and, in addition, provides a higher input impedance to the amplifier unit 12. This is due to the effects of transformer losses and limited inductance being degenerated out by the feed-back.

In the illustrated embodiment, demodulation means are provided to reform the same wave form as was applied to the input to the amplifier, but in amplified form. The demodulator may take several forms but is illustrated as a chopper switch 20 having a contact blade 21 which is oscillatable between two stationary contact members 22, 23. Contact blade 21 operates in synchronism with contact blade 3 of the input chopper switch 4 and this is indicated schematically on the drawing by the broken line 24 interconnecting the two chopper switches. The center tap **15*a* on the output transformer is connected to an output lead 25 and the two outer ends of the secondary winding halves 15*b*, 15*c* are connected respectively to the stationary contact members 22, 23 of the demodulating chopper switch. The contact blade 21** of the latter can be connected to ground, as indicated.

The amplified output at lead 25 can be used directly, or if desired, can be put through a further power amplifier unit, not illustrated, and then fed to the point of use such as, for example, a recorder. For some applications, the demodulator means can be omitted and the output from the secondary of the output transformer used directly.

In the embodiment illustrated in FIG. 2, the arrangement is generally similar to that shown in FIG. 1 and corresponding components have been assigned the same reference numerals. However, the input transformer 26 is arranged somewhat differently, the primary being split into two separate windings **26*a*, 26*b*, and the output transformer is provided with a center-tap tertiary winding, the center tap being indicated at 27 and the winding halves by 28*a*, 28*b*. Potentiometer resistances 29 and 30 are connected respectively in circuit with the winding parts 28*a*, 28*b* for purposes of gain control, the adjustable taps on these resistances being actuated simiultaneously by means of the schematically indicated linkage 31 in order to adjust the amount of the negative feed-back alternating voltage which is to be connected in series with the primary winding parts 26*a*, 26*b*** of the input transformer.

I claim:

1. In an amplifier of the commutated input type, the combination comprising an input transformer having a primary composed of first and second winding parts and a secondary winding, alternating current amplifying means having its input connected to said secondary winding, means deriving first and second alternating current negative feed-back signals from the output of said amplifying means, an input signal commutating means alternately connecting a signal source to said first and second parts of said primary winding, circuit means connecting said first alternating current negative feed-back signal in series with said first part of said primary winding, and circuit means connecting said second alternating current negative feed-back signal in series with said second part of said primary winding.

2. An amplifier of the commutated input type as defined in claim 1 wherein said means deriving said first and second alternating current negative feed-back signals are constituted respectively by outputs from tertiary windings of an output transformer connected to the output of said amplifying means.

3. An amplifier of the commutated input type as defined in claim 2 wherein said first and second primary winding parts of said input transformer are the two parts of an intermediately tapped single winding and said tertiary windings are separate from each other.

4. An amplifier of the commutated input type as defined in claim 2 wherein said first and second primary winding parts of said input transformer are separate from each other and said tertiary windings are constituted respectively by the two parts of an intermediately tapped single winding.

References Cited by the Examiner

UNITED STATES PATENTS 2,901,563 8/59 McAdam et al. ---------- 330—9

ROY LAKE, *Primary Examiner.*